METHOD OF ELECTRODEPOSITING A MAGNETIC ALLOY AND ELECTROLYTE THEREFOR

Filed Sept. 9, 1968

FIG. A, FIG. 2

INVENTORS.
PAUL E. McQUAID
ANTHONY J. KOLK, JR.
By White & Haefliger
ATTORNEYS.

United States Patent Office 3,578,571

Patented May 11, 1971

3,578,571
METHOD OF ELECTRODEPOSITING A MAGNETIC ALLOY AND ELECTROLYTE THEREFOR

Paul E. McQuaid, Canoga Park, and Anthony J. Kolk, Jr., Palos Verdes Peninsula, Calif., assignors to General Precision Systems Inc.

Filed Sept. 9, 1968, Ser. No. 758,548
Int. Cl. C23b 5/32
U.S. Cl. 204—43 13 Claims

ABSTRACT OF THE DISCLOSURE

Magnetically responsive coatings affording high coercivity properties and a very high squareness ratio are achieved by electrodeposition of Co, Ni and P from a bath in which the ratio of Co to Ni is approximately 1.5.

BACKGROUND OF THE INVENTION

(1) Field of the invention

The invention is concerned with magnetically responsive devices and particularly with improvements in such devices for information storage and retrieval applications. The invention provides methods and compositions for achieving improvements in devices having magnetically responsive alloy coatings such as discs, drums, cards and tapes onto which data bits are placed by magnetic means.

In addition to physical and chemical characteristics such as abrasion and corrosion resistance, magnetic alloy coatings are evaluated for desirable read voltage, write current, frequency response and modulation. Hysteresis properties too are of extreme importance, of course, including a maximum coercivity and a B–H loop profile having a squareness ratio $B_r/B_s$, at a maximum. $B_r$ herein refers to the retentivity characteristic of the coating and $B_s$ refers to flux density required for magnetic saturation of the coating. It is in the achieving of high coercivity characteristics and high squareness ratios, e.g., 0.75 and higher combined that the present method and compositions excel.

(2) Prior art

It is known to electrodeposit magnetic alloy components onto substrates, although the general practice in the past in forming magnetic alloy coatings for rotating memory devices such as recording discs has been to employ electroless baths. Past electrodeposition techniques have utilized Co, Ni and P alloys. These known procedures have not to our knowledge been commercialized, apparently because of the relatively high concentration of components needed in the bath, which increases cost. The increased cost has heretofore not been justified by the realization of any dramatic improvements in magnetic properties over the widely used electroless procedures.

In this invention dramatic improvements in coercivity levels and particularly in squareness ratios are achieved and at lower cost due to reduced concentration of coating components in the bath.

SUMMARY OF THE INVENTION

The present invention provides a surprising improvement in magnetic characteristics of Co-Ni-P alloys. The invention includes a method producing magnetically responsive coatings which have characteristically a high coercivity value and a high squareness ratio which method includes electrodepositing cobalt (Co), nickel (Ni) and phosphorous (P) onto a substrate from an aqueous electrodeposition bath and, during deposition, maintaining the weight ratio of cobalt to nickel in the bath between 1.425 and 1.575. The weight ratio of cobalt to phosphorus is not narrowly critical and generally will be above above about 15. It is a significant economic advantage of the present method that the concentration of cobalt in the bath may be relatively low, e.g., less than 100 grams/liter. The pH of the bath is desirably distinctly acid and will usually be below 4.5. The substrate is typically immersed in the bath as a cathode and current is passed through the bath between an anode and the cathode. e.g., at a current density between 5 and 10 amps per square decimeter (amps/dm.$^2$) to coat the substrate or a portion thereof with an alloy having, in general, the composition by weight of: cobalt 87–89%, nickel 7.9–8.2% and phosphorous 3–5%.

In a specific embodiment, we form a layer of magnetically responsive alloy on a metallic substrate such as aluminum by immersing the substrate as a cathode in an electrodeposition bath consisting essentially of:

| | |
|---|---|
| $CoCl_2 \cdot 6H_2O$ | 84 g./liter±5%. |
| $NiCl_2 \cdot 6H_2O$ | 56 g./liter±5%. |
| Buffering agent | Quantity sufficient to maintain pH between 3.0 and 4.0. |
| $MeH_2PO_2 \cdot H_2O$ | 5.0 g./liter. |

in which Me is an alkali metal, agitating the bath maintained at a temperature between 90° and 150° F. and passing a current through the bath at a current density of about 5 amp/dm.$^2$ for about 25 to 50 seconds to form a deposit from about 20 to 25 microinches in thickness.

The electrodeposition bath consists essentially of an aqueous solution of a source of cobalt ion, a source of nickel ion, said ions being in a weight ratio of 1.425 to 1.575 of the former to the latter and a source of phosphorous ion, the bath having a pH below 4.5. The halides are preferred sources of cobalt and nickel ion, particularly the chlorides and fluorides such as cobaltous chloride ($CoCl_2 \cdot 6H_2O$) which commercially is hexahydrated and cobaltous fluoride and nickel chloride, which also is available commercially as the hexahydrate, and nickel fluoride. The named chlorides may be used at concentrations of less than 95 grams/liter of the cobalt and less than 65 grams/liter of the nickel chloride. A convenient source of phosphorous ion is a water soluble hypophosphite salt. Concentrations, e.g., of sodium hypophosphite may be less than 10 grams/liter. A buffering agent may be included in the bath to facilitate maintaining pH at suitable levels, e.g., between 2.0 and 4.5. In all instances it is preferred to have the bath free of hydrocarbon material.

Through the practice of the method with the bath compositions just described information storage devices may be realized comprising a nonmagnetic substrate such as Mylar or aluminum of suitable shape, e.g., disc shaped or in tape form and a magnetically responsive Co-Ni-P alloy coating thereon having a coercivity above about 400 oersteds and a $B_r/B_s$ ratio or squareness ratio of above about .75 and generally .8 to .9 and higher, the coating containing by weight cobalt 87–89%, nickel 7.9–8.2% and phosphorus 3–5%.

BRIEF DESCRIPTION OF THE DRAWINGS

FIG. 2 is a fragmentary sectional view of a memory or information storage device having an alloy coating according to the invention; and FIG. A is a representation of a B–H loop typically associated with prior art magnetic alloy coatings in which the coating bath has a Co/Ni ratio of about 1.

DESCRIPTION OF THE PREFERRED EMBODIMENTS

Example 1

Figure 1:
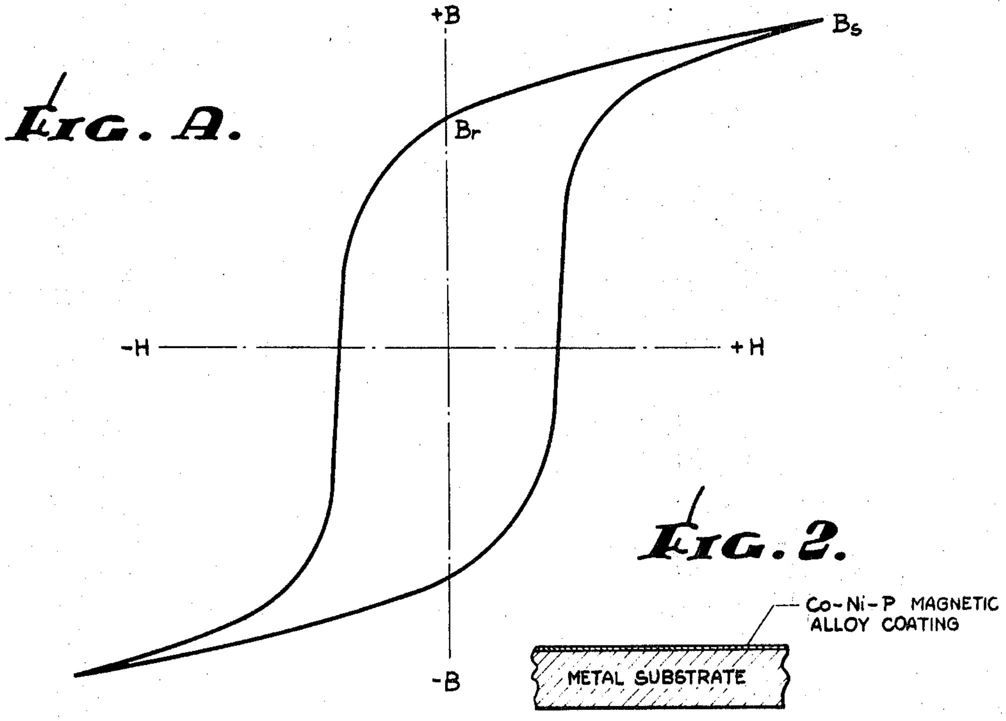
FIG. 1 is a representation of a B–H loop for the coatings obtained with the bath composition and electrodeposition method of the present invention.
Figure 1:
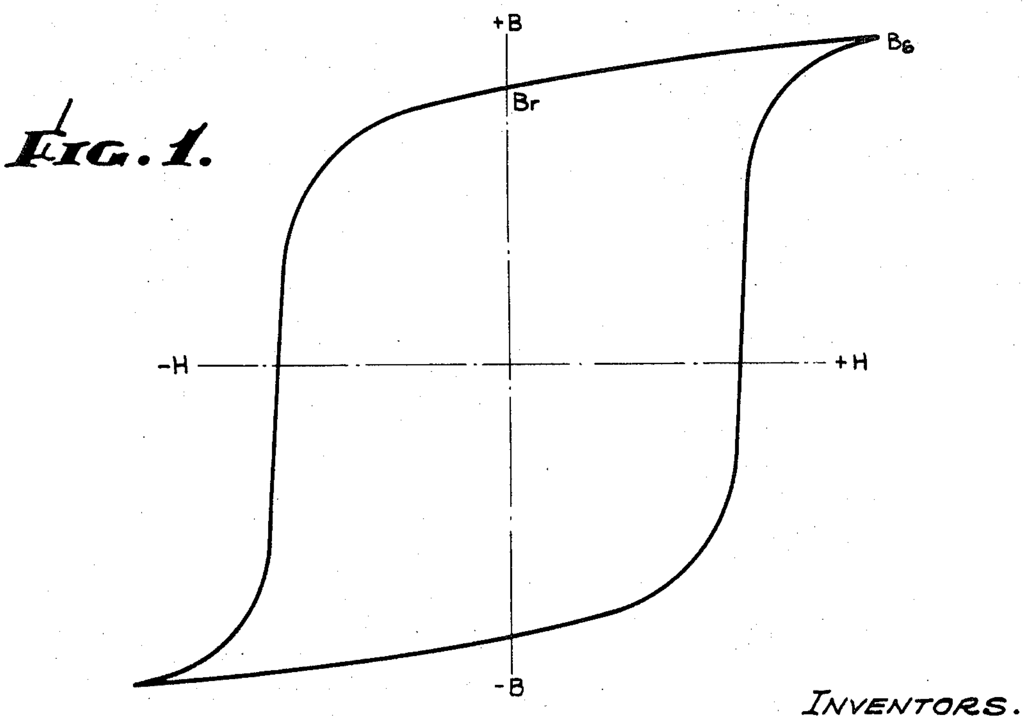

An electrodeposition bath was prepared as follows:

| | G./liter |
|---|---|
| $CoCl_2 \cdot 6H_2O$ | 84 |
| $NiCl_2 \cdot 6H_2O$ | 56 |
| Buffer salt, $NH_4Cl$ | 100 |

were dissolved in distilled water which was then warmed to about 120° F.

$NaH_2PO_2 \cdot H_2O$ ---- 4–6 g./liter was slurried in a minimum quantity of distilled water and added to the previously prepared solution which had been filtered and transferred to a plating tank. pH of the bath was about 3.5. The bath was warmed to 122° F. and nickel anodes inserted. Mild agitation was provided and a substrate comprising a 16-inch disc of 7075 aluminum having a conventionally activated surface and coating of Ni–H was immersed. Current was passed through the bath at a density of 5 amps/dm.$^2$ for 33 to 42 seconds to produce a coating of 20 to 25$\mu$ inches in thickness. A different thickness coating was obtained on a second disc substrate. Thickness and coercivity for these coatings was as follows: Disc 1: thickness, 25$\mu$ inches; coercivity, 600 oe. Disc 2: thickness, 29.5$\mu$ inches; coercivity, 500 oe. Coercivity data was obtained from a magneto-optic B–H looper.

The Read-Write characteristic of these discs was evaluated at 3600 r.p.m. In each case frequency response exceeded 2 mHz. Read voltage was 34–44 mv. for Disc 1 and 25–30 mv. for Disc 2 with a different head bar than used for 1. Write current (to saturation) was 80 and 75 ma. for Discs 1 and 2, respectively.

The foregoing values are only illustrative of the desirable values of coercivity obtainable in the coatings of the present invention. Squareness ratios for Discs 1 and 2 were above 0.8.

The bath used in forming the present coatings consists essentially of a source of cobalt ion, a source of nickel ion and a source of phosphorous ion in an aqueous solution at an acid pH.

Various sources of cobalt ion may be utilized alone or in mixtures with other sources. In general suitable sources will be water dissociable salts of cobalt particularly inorganic salts such as halide salts. Among sources of cobalt ion that may be used there may be listed cobaltous acetate, cobaltous ammonium chloride, cobaltous bromide, cobaltous chloride, cobaltous iodide, cobaltous nitrate, and cobaltous sulfate. Preferred cobalt ion sources may be characterized as salts of divalent cobalt with anions of strong mineral acids including $Cl^-$, $Br^-$, $No_3^-$, and $SO_4^=$ anions.

Various sources of nickel ion may be utilized alone or in mixtures with other sources. In general suitable sources will be water dissociable salts of nickel particularly inorganic salts such as halide salts. Among sources of nickel ion that may be used there may be mentioned nickel bromide, nickel chloride, nickel ammonium chloride, nickel iodide, nickel nitrate, and nickel sulfate (hexahydrate). Preferred nickel ion sources may be characterized as salts of nickel with anions of strong mineral acids including $Cl^-$, $Br^-$, $I^-$, $NO_3^-$ and $SO_4^=$.

Various hypophosphite sources of phosphorous ion may be utilized alone or in mixtures with other sources. Typical hypophosphite compounds will include water soluble hypophosphites especially such salts of alkali or alkaline earth metals and like elements or of an amine group, e. g., ammonium hypophosphite, potassium hypophosphite, and sodium hypophosphite. Preferred hypophosphite sources of phosphorous ion may be characterized as those having the formula $MeH_2PO_2$ in which Me is an alkali or alkaline earth metal and particularly an alkali metal having an atomic number less than 40. Other sources of phosphorous ion may be used, such as hypophosphorous acid.

The ratio of cobalt to nickel in the electrodeposition baths has been found to exert profound effect on the magnetic characteristics of the coating. That is without a ratio of cobalt to nickel in the bath of at least 1.425 and no more than 1.575 coercivity drops off and squareness of the B–H loop is adversely affected. Performance of the coating thus has been found to be intimately dependent on the Co/Ni ratio taught herein.

In FIG. 1 a B–H loop is depicted for a Co–Ni–P alloy coating prepared on aluminum from a bath in which the cobalt/nickel ratio was 1.5. As is conventional the horizontal axis is the magnetic intensity, H, axis and the vertical axis is the flux density or magnetic induction, B, axis. The squareness of a B–H loop is determined by the relationship of the saturation level of flux density indicated as $B_s$ and the remanent magnetization or retentivity indicated as $B_r$. In FIG. 1, the $B_r/B_s$ ratio is obviously high, being about .85.

In FIG. A a typical B–H loop a Co–Ni–P alloy coating on the same substrate but applied by an electroless process and with a Co–Ni ratio in the bath of 1 is depicted. The slope of the $B_s$–$B_r$ line is greater than in the FIG. 1 coating evidencing a lower ratio of $B_r$ to $B_s$, namely about .69.

The ratio of phosphorus ot other components is not narrowly critical and may range from 1 part per 15 parts of cobalt to 0.6 part per 15 parts. The coercivity of the final coating is influenced positively by increasing concentration of hypophosphite in the bath but squareness ratio may decrease with excessive hypophosphite. Thus for maximum coercivity with good squareness this concentration should be between 4.5 and 5.5 g./liter where the $CoCl_2 \cdot 6H_2O$ concentration is 84 g./liter.

In carrying out electrodeposition the current density will generally range between 5 and 10 amp per square decimeter with higher and lower density values altering the balance of corecivity and squareness achieved within the stated range. This is a lower density than previous electrodeposition processes for Co-Ni-P increasing economy of operation derived from using relatively dilute bath conditions.

Bath temperature is above room temperature and less than boiling and preferably between about 100 and 140° F.

The pH of the bath is desirably at a value as high as possible without causing undue precipitation of bath components or loss of coercivity or squareness. Generally this value has been found experimentally to be about pH 3.5. Good results with high uniformity are realized by operating in the range of pH 2.0–4.5.

A salt of a stong acid, e.g., halide, phosphorus or sulfur or nitrogen acid with a weak base, e.g., an alkaline earth metal or ammonium hydroxide base may be used to buffer the electrodeposition bath to a particular pH. Desirably the bath pH is between 3.0 and 4.0 and specifically to be preferred is a pH of 3.5. This range is maintainable with such buffer salts as particularly ammonium halides, e.g., ammonium chloride and bromide, and the like. Other buffering amine salts may be mentioned including ammonium phosphate, ammonium fluoride, ammonium nitrate and ammonium sulfate.

The practice of the method provides magnetic storage devices which comprise, with reference to FIG. 2, a substrate which is suitably rigid or flexible as needs dictate and is at least conductive over a portion of its surface. The substrate has a coating thereon of the Co-Ni-P alloy above described. Aluminum if used may be alkaline and acid cleaned, surface treated for corrosion resistance and adhesion, e.g., by the Zincate, Alstan or anodize technique and then preliminarily treated with copper and nickel phosphorous alloy and anodically activated in an acid bath prior to application of the magnetic alloy.

We claim:

1. In the method of forming high coercivity, high squareness ratio magnetically responsive coatings on a conductive substrate which includes electrodepositing Co, Ni and P onto the substrate from an aqueous bath at a temperature above about 90° F. containing electrodepositable amounts thereof, said bath having a pH between 2.0 and 4.5, and a weight ratio of Co to P in the bath of at least 15 to 1, the improvement comprising the steps of immersing said substrate into said bath as a cathode, passing a current through said bath between said substrate and an anode at a current density between 5 and 10 amps/dm.$^2$ and maintaining the concentration of cobalt salt at less than 95 grams/liter and the weight ratio of Co to Ni in the bath between 1.425 and 1.575 during deposition of the coating.

2. Method according to claim 1 wherein said coating has P, Ni and Co in a weight ratio of about 3–5% P, 7.9–8.2% Ni and 87–89% Co.

3. Method for producing high coercivity, magnetically responsive devices having very high squareness ratios including forming a layer of magnetically responsive alloy on an aluminum substrate by immersing the substrate as a cathode in an aqueous electrodeposition bath consisting essentially of

| | |
|---|---|
| $CoCl_2 \cdot 6H_2O$ | 84 g./liter±5%. |
| $NiCl_2 \cdot 6H_2O$ | 56 g./liter±5%. |
| Buffering agent | Q.S. to maintain pH between 3.0 and 4.0. |
| $MeH_2PO_2 \cdot H_2O$ | 4.5–5.5 g./liter. |

wherein Me is an alkali metal and wherein the weight ratio of Co to P in the bath is at least 15 to 1, agitating the bath maintained at a temperature between 90° and 150° F. and passing a current through the bath at a current density of about 5 amps/dm.$^2$ to deposit Co, Ni and P onto the substrate.

4. Method according to claim 3 including also effecting deposition for 25 to 50 seconds.

5. Method according to claim 4 including also forming a deposit of 20 to 25μ inches in thickness.

6. Electrodeposition bath suitable for forming high squareness ratio magnetically responsive coatings on metallic aluminum substrates which consists essentially of not more than 95 grams/liter of a source of cobalt ion and not more than 65 grams/liter of a source of nickel ion in a weight ratio of 1.5 of the former to the latter ion and not more than 10 grams/liter of a source of phosphorous ion, wherein the weight ratio of Co to P in the bath is at least 15 to 1, said ions being present in electrodepositable amounts in an aqueous bath having a pH below 4.5.

7. Electrodeposition bath according to claim 6 in which the source of phosphorous ion is a hypophospite salt.

8. Electrodeposition bath according to claim 7 in which the nickel ion source is nickel chloride.

9. Electrodeposition bath according to claim 8 in which the cobalt ion source is cobaltous chloride.

10. Electrodeposition bath according to claim 9 including also a pH buffering salt to maintain the bath pH between 2.0 and 4.5.

11. Electrodeposition bath according to claim 10 in which the cobalt ion source is a cobalt halide.

12. Electrodeposition bath according to claim 10 in which the nickel ion source is a nickel halide.

13. Electrodeposition bath according to claim 6 in which said bath is free of hydrocarbons.

References Cited

UNITED STATES PATENTS

| | | | |
|---|---|---|---|
| 2,644,787 | 7/1953 | Bonn et al. | 204—43 |
| 3,152,974 | 10/1964 | Zentner | 204—43 |
| 3,227,635 | 1/1966 | Koretzky et al. | 204—43X |

GERALD L. KAPLAN, Primary Examiner

U.S. Cl. X.R.

29—194; 75—170